(12) United States Patent
Dietrich, Jr.

(10) Patent No.: US 12,280,971 B2
(45) Date of Patent: Apr. 22, 2025

(54) HIGH CONTAINMENT DISCHARGE STATION

(71) Applicant: Fydec Holding SA, Ecublens (CH)

(72) Inventor: Frédéric Dietrich, Jr., Morrens (CH)

(73) Assignee: Fydec Holding SA, Ecublens (CH)

( * ) Notice: Subject to any disclaimer, the term of this patent is extended or adjusted under 35 U.S.C. 154(b) by 553 days.

(21) Appl. No.: 17/294,494

(22) PCT Filed: Nov. 15, 2018

(86) PCT No.: PCT/EP2018/081372
§ 371 (c)(1),
(2) Date: May 17, 2021

(87) PCT Pub. No.: WO2020/098940
PCT Pub. Date: May 22, 2020

(65) Prior Publication Data
US 2022/0055850 A1 Feb. 24, 2022

(51) Int. Cl.
*B08B 15/02* (2006.01)
*B65B 69/00* (2006.01)
*B65G 69/18* (2006.01)

(52) U.S. Cl.
CPC ............ *B65G 69/181* (2013.01); *B08B 15/02* (2013.01); *B65B 69/00* (2013.01)

(58) Field of Classification Search
CPC .... B65G 69/181; B65G 69/186; B65G 15/60; B08B 15/02; B65B 15/026; B65B 69/00
(Continued)

(56) References Cited

U.S. PATENT DOCUMENTS 3,058,590 A * 10/1962 Larson ...................... B07B 4/08
209/137
3,385,436 A * 5/1968 Murphy .................. B07B 11/06
55/432
(Continued)

FOREIGN PATENT DOCUMENTS

CN 1644471 A 7/2005
DE 202011051992 U1 * 1/2012 ........... B08B 15/023

OTHER PUBLICATIONS

DE-202011051992-U1 English Translation of Specification (Year: 2022).*
(Continued)

*Primary Examiner* — David Colon-Morales
*Assistant Examiner* — Stephanie A Shrieves
(74) *Attorney, Agent, or Firm* — Bachman & LaPointe, P.C.

(57) ABSTRACT

A discharging apparatus for discharging loose and in particular pulverulent material that is hazardous to health from rigid or flexible containers (12), in particular bags and barrels (13), comprising a discharge chamber (2) which has a discharge opening (5) for discharging the material after removal from a container (12) and which additionally has an insertion opening (3) for at least partial insertion of a container (12) into the discharge chamber (2). According to the invention, the discharge chamber (2) has a ventilation opening (4) which is arranged at a side of the discharge chamber (2) opposite the insertion opening (3) and which is connected to pump means (10) in such a way that an air stream can be generated inside the discharge chamber (2), which causes a laminar air flow starting from the insertion opening (3) and leading in the direction of the ventilation opening (4).

19 Claims, 3 Drawing Sheets

(58) Field of Classification Search
USPC .............................................. 141/1; 198/811
See application file for complete search history.

(56) References Cited

U.S. PATENT DOCUMENTS

| | | | | |
|---|---|---|---|---|
| 3,744,619 | A * | 7/1973 | Dolgolenko | B65G 69/186 198/811 |
| 4,714,097 | A * | 12/1987 | Binzen | B65G 69/186 141/93 |
| 5,302,071 | A * | 4/1994 | Binzen | B65G 69/186 414/373 |
| 5,397,371 | A * | 3/1995 | Hough | B65B 1/28 55/432 |
| 5,816,772 | A * | 10/1998 | Py | B01L 1/02 414/412 |
| 6,581,778 | B1 * | 6/2003 | Kato | B65G 69/186 55/DIG. 12 |
| 7,587,882 | B2 * | 9/2009 | Rocholl | B65B 69/0008 414/412 |
| 11,325,736 | B2 * | 5/2022 | Gabusi | B65B 69/0008 |
| 2005/0161451 | A1 * | 7/2005 | Maginot | B65B 69/0075 220/1.6 |

OTHER PUBLICATIONS

Dec-Group. "Powder Handling Excellence Containment . Entleeren" Mar. 27, 2016 (Mar. 27, 2016). Retrieved from the Internet: https://www.dee-group.de/fileadmin/01_Content/Products/Brochures_Copied/Broschures_DE/DEC Contained-Bag-Station_de_2.pdf.

Frederic Dietrich. "Bezopachye texholoGii ppoizBodctBa AktiBhyx FapmatseBtiheckix Cybctahtsii" May 31, 2018 (May 31, 2018). Retrieved from the Internet: https://x-tech.su/news/2018_05_31/Bezopachye%20texholoGii%20ppoizBodctBa%20AFC.%20Fpedepik%20Ditpix. pdf, pp. 97-100.

Klaus Meichle. "Pulveraufgabe im Isolator. Containment auf den Prozess zugeschnitten—prozesstechnik online" Nov. 3, 2016 (Nov. 3, 2016). Retrieved from the Internet: https://prozesstechnik.industrie.de/pharma/pulveraufgabe-im-isolator/#slider-intro-1.

* cited by examiner

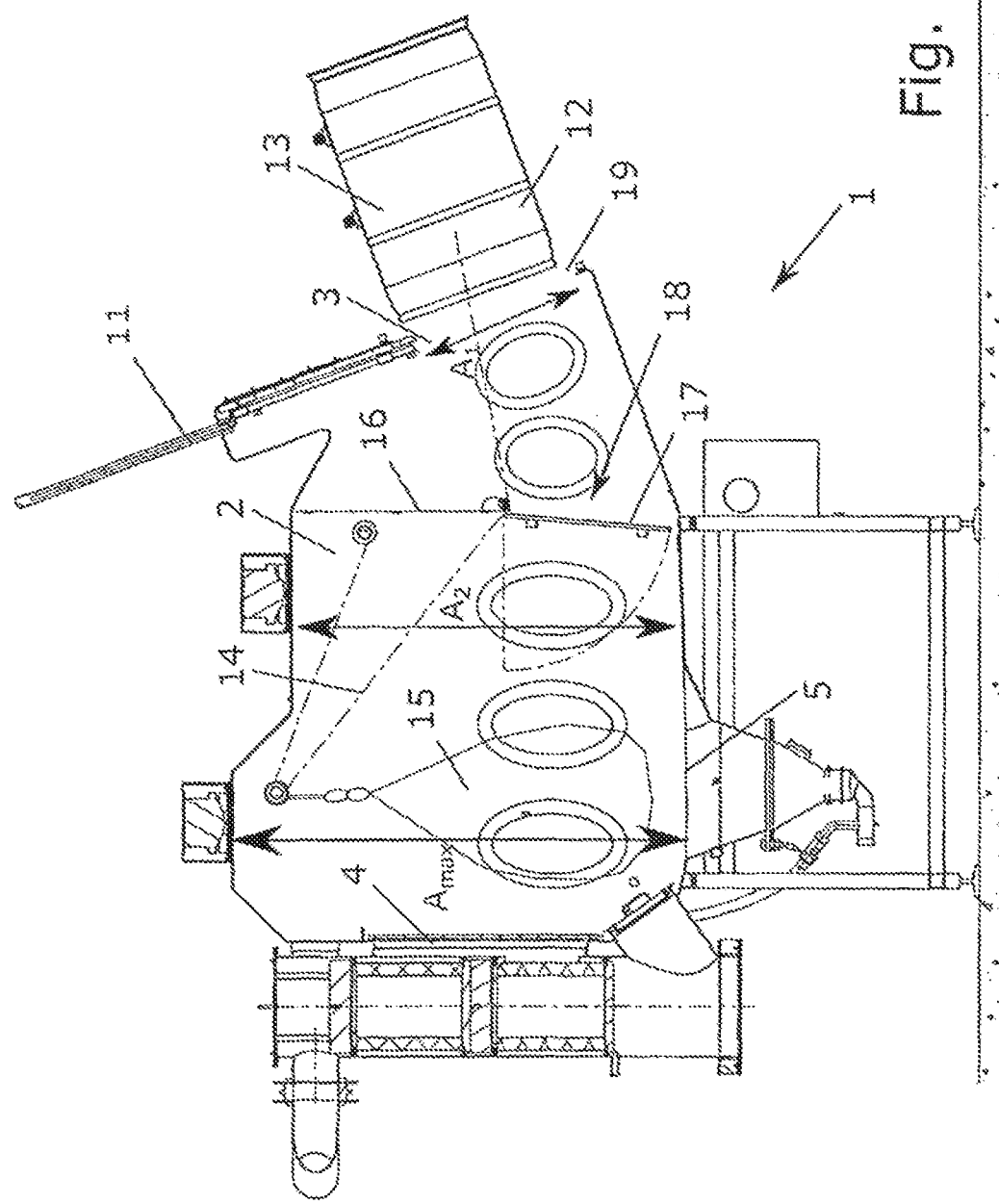

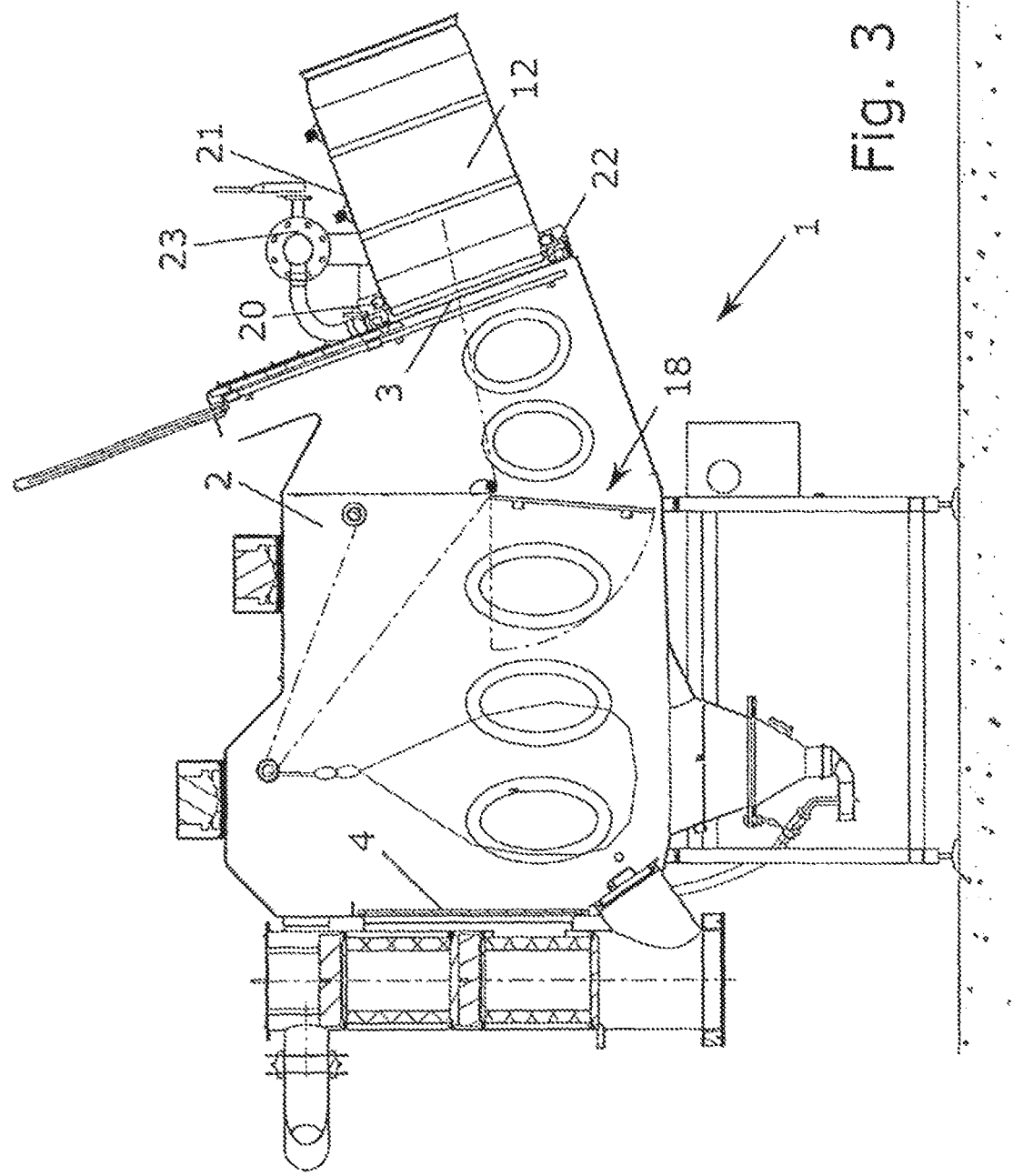

HIGH CONTAINMENT DISCHARGE STATION

BACKGROUND OF THE INVENTION

The present invention relates to an unloading device for loose, in particular powdery, material which is hazardous to health and/or toxic from rigid or flexible containers, in particular bags and drums, the unloading device comprising an unloading chamber comprising a discharge opening discharging the material after removal from a container, the unloading chamber further having an insertion opening for at least partial insertion of a container into the unloading chamber.

Furthermore, the present invention relates to a method for unloading loose, in particular powdery, material which is hazardous to health and/or toxic from rigid or flexible containers, in particular bags and drums, preferably by means of a device according to the invention, the method comprising at least the partial insertion of a container into an unloading chamber via an insertion opening of the unloading chamber and the emptying of the container and the discharge of the material via a discharge opening of the unloading chamber.

The unloading of materials which are hazardous to health and/or toxic is inevitable in various areas of industrial handling of materials. Before they are unloaded, the materials are usually accommodated and secured in corresponding containers in order, for example, to ensure the safe transport of the material. For further processing of the materials in question, however, they must be removed from said containers and fed to another, preferably shielded or closed-off, further processing process. For reasons of occupational health and safety, the operators of corresponding unloading stations, i.e., the users of such hazardous materials, have drawn up partly individual, partly standardized specifications concerning the amount of material that can be released, i.e., in particular, that is allowed to escape into the ambient air, in the course of the unloading. Typically, limit values are set which depend on the respective toxicity or hazardousness of the material. In this context, said limit values are usually referred to as OELs (occupational exposure limits) or OEBs (operational exposure bands). These limits specify how many micrograms of the material in question per cubic meter of ambient air may be measured or detected in an environment of the unloading station. For example, 1 µm to 10 µm per cubic meter of ambient air of the corresponding material is set as the limit value for materials which are assigned to a class 4 OEB. Accordingly, only 0.1 µm to 1 µm of material per cubic meter of air may be found for a substance which has a class 5 OEB.

For such hazardous and/or toxic substances, unloading stations and unloading methods have previously been used in which an unloading lock or airlock was provided and used for the respective containers. This means that the respective container was first transferred from the outside into a lock chamber before the containers were transferred into a corresponding unloading chamber of the unloading station. However, such lock or airlock systems have numerous disadvantages.

Firstly, the access to the containers in the lock from the unloading chamber is insufficient; as a result, un-ergonomic movements and therefore movements which are unhealthy for the operator must be performed and burdens must be endured. Additionally, the unloading or emptying including a temporary storage in a corresponding lock is time-consuming and therefore particularly limits the throughput of containers or the corresponding amount or volume of material to be unloaded.

Alternatively, systems and devices are known which use a disposable adapter in the form of an outer liner. As a first step, a connection and sealing of the adapter or outer liner and the container, e.g. the drum, is established. A tight coupling of the outer liner with a glovebox is then established in order to empty the container, for example in order to remove an inner liner. Following the emptying, a low-contamination or contamination-free decoupling of the container must be ensured; to this end, the adapter or inner liner, for example, is sealed at two points and is then severed into two parts. This system is also very laborious and requires a large amount of time and resources for unloading or emptying the containers.

However, since there definitely are applications or application scenarios in which an unloading or emptying of 40 to 45 containers per hour is to or has to be performed for materials which have a contamination limit value of OEB 4, the corresponding use of known unloading stations and the use of known unloading methods is not possible.

Devices and methods according to the preamble of the independent claims are already known from the state of the art: "DEC-Group: Powder Handling Excellence Containment Emptying" and U.S. Pat. Nos. 3,744,619 A and 6,581,778 B1.

A device in which an airflow is generated around a container reception opening is known from DE 20 2011 051 992 U1.

Likewise, "Klaus Meichle: Pulveraufgabe im Isolator. Containment auf den Prozess zugeschnitten—prozesstechnik online" ["Klaus Meichle: Powder application in the insulator. Containment tailored to the process-process technology online"] already discloses a container unloading or emptying in a room with a laminar airflow.

SUMMARY OF THE INVENTION

Starting from the state of the art mentioned above, the object of the invention is to indicate an improved unloading device and an improved unloading method for materials that are hazardous to health or toxic from corresponding containers which allow the stringent limit values with respect to the contamination of the environment for highly toxic materials to be complied with while still achieving quick and safe unloading and emptying of the material or of the containers.

With respect to the unloading device, said object is attained by the features disclosed herein, i.e., the object is attained in a generic device in that the unloading chamber has a ventilation opening which is preferably disposed on a side of the unloading chamber opposite the insertion opening and which is connected to pump means in such a manner that an airflow can be generated inside the unloading chamber, the airflow causing a laminar airflow from the insertion opening in the direction of the ventilation opening.

Surprisingly, the material can thus be unloaded or the containers can thus be emptied without causing increased contamination of the environment even if no corresponding lock or airlock is provided. Particularly surprisingly, it has even been found in this context that, as a complete renunciation of the principle of a lock, it is even possible to keep or leave the insertion opening open during the emptying or unloading process inside the unloading chamber without adversely affecting the contamination of the ambient air. Additionally, an insertion opening which is also open during the unloading or emptying has the advantage that containers which have different shapes and geometries, for example different diameters, can be processed and emptied, because no fit or seal with the container surface has to be established.

Thus, the idea of the invention provides that a laminar airflow exists inside the unloading chamber, at least during the unloading or emptying of the containers, said laminar airflow carrying particles of the material to be unloaded away from the insertion opening and thus largely or almost completely avoiding contamination of the ambient air. A particularly advantageous effect of the generation and maintenance of the airflow as a laminar airflow is that eddies or similar turbulences in the airflow are thus prevented. Said turbulences, in turn, could potentially lead to return flows in the airflow and thus cause or contribute to the contamination of the ambient air.

Another particular advantage compared to a solution comprising a lock is that the cleaning of the device is significantly simplified and facilitated, since separate cleaning of two chambers, i.e., the lock chamber and the unloading chamber, is no longer necessary; instead, only the unloading chamber has to be cleaned. The setup time or the downtime of the device is thus significantly reduced.

A first advantageous embodiment of the unloading device can provide that the cross section of at least part of the unloading chamber increases from the insertion opening in the direction of the ventilation opening. This means that the airflow, in particular the speed of the laminar airflow, decreases from the insertion opening or, put conversely, increases toward the insertion opening. This has the particular advantage that as long as the airflow as a whole remains in the range of a laminar flow, especially in the area of the insertion opening where the likelihood of escape of a particle of the material to the ambient air is particularly high, an adequately strong airflow exists and the particles of the material are thus effectively transported away by means of the airflow. In principle, the cross section of the unloading chamber can vary. Preferably, the cross section can be rectangular. A significant reduction of the speed of the laminar airflow can be achieved by the at least partial increase of the cross section, which, in turn, has the advantageous effect that no turbulence occurs inside the unloading chamber and that particles of the material are effectively transported away from the area of the insertion opening by means of the airflow. In order not to cause or produce contamination of the ambient air in the area of the ventilation opening either, the use of filter devices, such as double HEPA filers and additional pre-filters, can consequently be provided between the ventilation opening and the pump means to retain the material particles inside the unloading chamber.

Another particularly advantageous embodiment can provide that a closure device for the reversible opening and closing of the insertion opening is assigned to the insertion opening. In this way, it can be ensured, in particular before and after operation of the unloading device, i.e., whenever no laminar airflow is being generated by the pump means via the ventilation opening, that material particles still inside the unloading chamber are not released into the environment and the ambient air. As already indicated above, said closure device can particularly advantageously remain open during the actual unloading or emptying of the containers in order to ensure inter alia that the laminar airflow between the insertion opening and the ventilation opening is maintained and, in particular, that no vacuum is created in the unloading chamber. Alternatively, it can be provided that the closure device is closed during the unloading or emptying and therefore closes the insertion opening; in this case, adequate means are to be provided to continue to cause a laminar airflow from the insertion opening in the direction of the ventilation opening during the unloading or emptying. An embodiment to the effect will be described below. For example, the closure device can be realized as a displaceable or pivotable closure device.

The invention also provides that a preferably vertical partition wall having a variable passage opening is disposed between the insertion opening and the discharge opening inside the unloading chamber. This embodiment has the additional advantage that turbulence in the laminar airflow and, in particular, return flow in the direction of the insertion opening are prevented or minimized. For example, the variable passage opening of the preferably vertical partition wall can be a vertically hinged door having a double door hinged on both sides, for example, wherein, according to the invention, the opening is designed and dimensioned in such a manner that the containers to be emptied, insofar as they are completely received in the unloading chamber, can pass through the passage opening. According to the invention, the passage opening is to be designed in such a manner that no airtight sealing or closure is achieved by the partition wall in any state during the emptying, since, even if the passage opening is not fully open, the passage of the laminar airflow from the insertion opening through the partition wall in the direction of the ventilation opening must remain assured in order to maintain the laminar airflow.

Another particularly preferred embodiment of the unloading device provides that a seal device for the sealing contact with container surfaces, in particular drums, is disposed in the area of the insertion opening. This can be advantageous in order to ensure that extremely little material is released into the ambient air of the unloading device. Said seal device can be realized as an inflatable ring seal, for example, and can preferably be used in connection with containers, in particular drums, which are not completely, but only partially received—in particular only at an upper edge—by the unloading device, in particular inserted into the unloading device, in the course of the emptying.

In this case, the seal device also effects further securing of the container to the unloading device, safe unloading or emptying thus being enabled.

The invention also provides that a nozzle arrangement is disposed in the area of the insertion opening, wherein the nozzle arrangement is connected to the pump means in such a manner that an airflow in the direction of the ventilation opening can be generated. As already described above, the device according to the invention generally and extremely surprisingly allows the insertion opening of the unloading chamber to be left open even during the unloading or emptying process of the containers without contaminating the ambient air.

At the same time, however, this entails the risk that the material to be unloaded or to be emptied is contaminated or polluted itself by particles from the ambient air, which may lead to significant problems, in particular in the field of the chemical or pharmaceutical industry. Accordingly, in particular the provision of a nozzle arrangement as mentioned above makes it possible that, on the one hand, the insertion opening is closed or sealed during the unloading or emptying, but that, on the other hand, the laminar airflow between the insertion opening and the ventilation opening is maintained by means of required air entering the unloading chamber, in particular in the area of the insertion opening, via the nozzle arrangement and the pump means connected thereto. Particularly advantageously, the air can be cleaned or filtered before it is supplied via the nozzle arrangement in order to prevent contamination of the material to be unloaded. This embodiment is particularly advantageous if the unloading or emptying is to take place in a nitrogen atmosphere, for example because the unloaded materials are hazardous in some way, for example explosive, or susceptible to moisture, in particular humidity. In this case, it can be ensured that a laminar nitrogen flow is generated which prevents the contamination of the environment.

Another advantageous embodiment can provide that the pump means of the nozzle arrangement supply a largely identical volume flow of air to the unloading device, in particular to the unloading chamber, as is extracted from the unloading chamber of the unloading device on the other side via the ventilation opening and the pump means there. In this way, the pressure conditions inside the unloading chamber are kept constant. A particularly preferred embodiment can provide that the air extracted on the side of the ventilation opening is returned to the unloading chamber in a closed circuit via the insertion opening using the same pump means as described above, if applicable.

Another preferred embodiment of the unloading device can also provide that a container conveyor or transport means is disposed inside the unloading chamber. This means can be realized as a pulley system or as a conveyor belt, for example, and can be used to transport the container or inner layers of the container.

With respect to the method for unloading toxic, loose, in particular powdery, material hazardous to health, the object formulated above is attained by a generic method in which, at least during the emptying of the container, an airflow is generated by a ventilation opening, which is preferably disposed on a side of the unloading chamber opposite the insertion opening, and pump means assigned thereto, the airflow causing a laminar airflow from the insertion opening in the direction of the ventilation opening.

A particularly high level of pollution or contamination protection (high containment) is thus achieved by the method according to the invention, in particular without having to accept the disadvantages of an airlock or lock for the container as described above. In other words, this means that the method according to the invention allows the emptying or unloading of containers holding toxic material or material hazardous to health at a high throughput and, in particular, in an ergonomically advantageous manner.

A first advantageous method variant can provide that an airflow having a speed of 0.5 m/s to 1.0 m/s, preferably 0.6 m/s to 0.8 m/s, is generated in the area of the insertion opening by the ventilation opening in connection with the pump means. Thus, the speed of the laminar airflow is significantly higher than the speed of any other insulator or of a clean room. Such an airflow effectively ensures that force is applied to particles of the material and that said particles are consequently transported away from the insertion opening in the direction of the ventilation opening.

Another advantageous embodiment can provide that the cross section of at least part of the unloading chamber increases from the insertion opening in the direction of the ventilation opening, the speed of the airflow in the area of the discharge opening thus being reduced to approximately one third to one sixth of the speed in the area of the insertion opening, in particular to 0.1 m/s to 0.3 m/s. This is a particularly advantageous way of ensuring that no turbulences or eddies potentially causing a return flow and thus a discharge of particles from the unloading device, in particular the unloading chamber, occur in the airflow.

Another advantageous embodiment of the method can also provide that a volume of 200 cubic meters per hour to 800 cubic meters per hour is extracted through the ventilation opening. Of course, said throughput only applies to the times or operating times during which the corresponding pump means are activated and a laminar airflow is generated inside the unloading chamber. The throughput or the extracted volume is proportional to the size or surface of the insertion opening and can also differ from values mentioned above.

Another preferred variant of the method can also provide that containers pass a preferably vertical partition wall having a variable passage opening between the insertion opening and the discharge opening inside the unloading chamber before they are emptied. This also ensures that return flow or turbulence is prevented. Furthermore, such a partition wall can ensure that, even if turbulence or return flow occurs, the particles in question do not pass through the partition wall but are retained.

Furthermore, a particularly preferred embodiment of the method can provide that the insertion opening is opened by means of a closure device for the reversible opening and closing of the insertion opening in order to insert a container at least partially and preferably remains open during the emptying of the container. However, as already described above with respect to the device, it can also be provided that said insertion opening is closed or partially closed by means of the closure device after the at least partial insertion of a container. In this case, it is to be ensured that air supply is ensured in the area of the insertion opening so that the laminar airflow inside the unloading chamber can be maintained.

A preferred embodiment of the method can also provide that a seal device is disposed in the area of the insertion opening, the seal device being brought into sealing contact with a container surface, in particular a drum surface, before a container is emptied. This ensures that no opening or only a defined opening of the insertion opening remains when the container in question, in particular the drum in question, is arranged and sealed at the insertion opening.

Preferably, an embodiment of the method can also provide that a nozzle arrangement is disposed in the area of the insertion opening and is connected to pump means, an airflow in the direction of the ventilation opening thus being generated by the nozzle arrangement. Maintenance of the laminar airflow inside the unloading chamber can thus be ensured during the emptying or unloading, in particular when the insertion opening is closed.

BRIEF DESCRIPTION OF THE DRAWINGS

Further advantages, features and details of the invention are apparent from the following description of preferred exemplary embodiments and from the drawings.

In the drawings,

FIG. 2 shows a schematized illustration of an embodiment of an unloading device;

FIG. 3 shows a schematized illustration of a second embodiment of an unloading device realized according to the idea of the invention for performing the method according to the invention.

DETAILED DESCRIPTION

Figure 1:
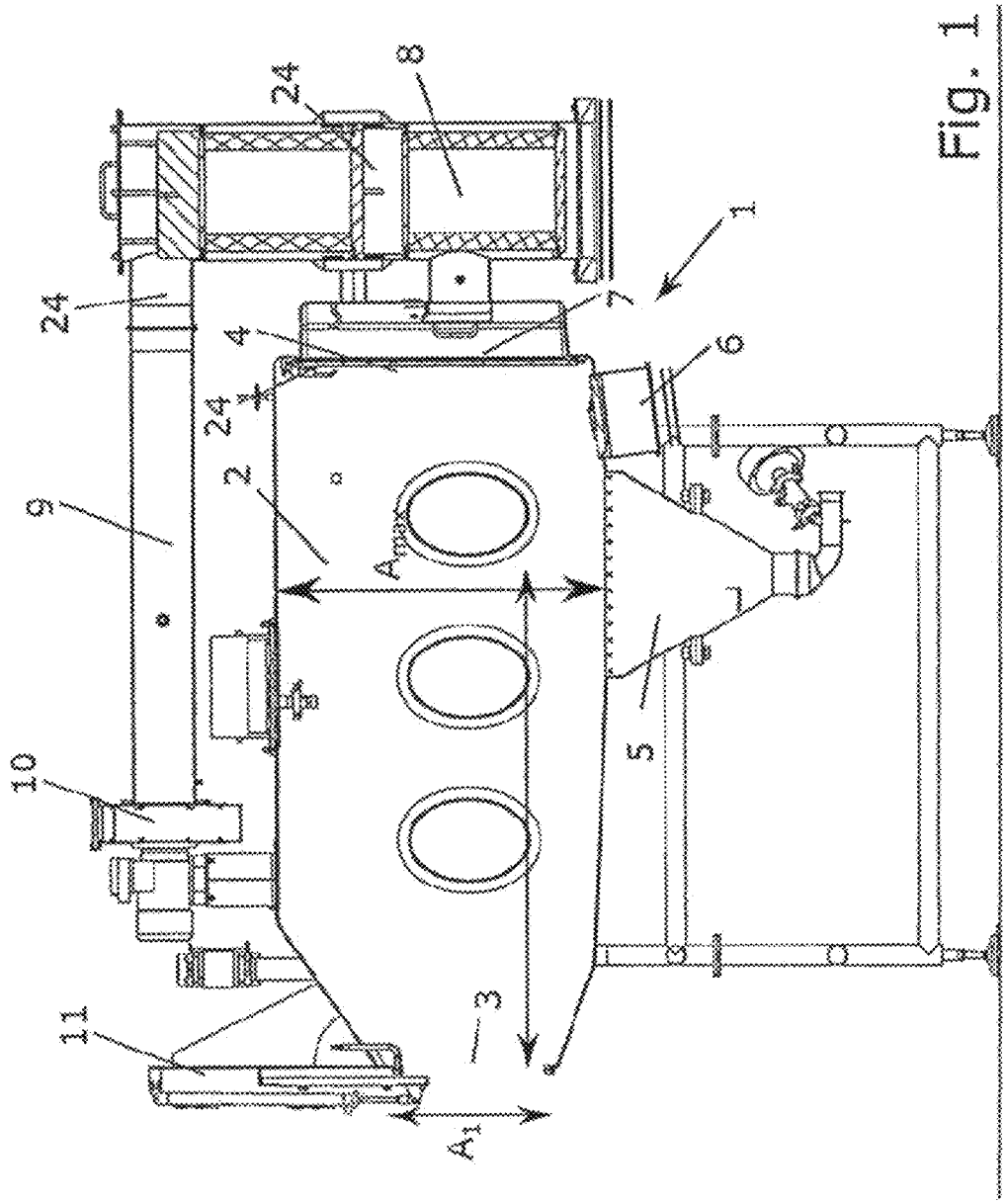
FIG. 1 shows a schematic illustration of a generic unloading device of the prior art.

FIG. 1 shows an unloading device 1 which has an unloading chamber 2 opening into an insertion opening 3 on one side and having a ventilation opening 4 on the opposite side. For example, insertion opening 3 can have a surface $A_1$ of 0.1 m² to 0.4 m², preferably 0.2 m² to 0.3 m². Ventilation opening 4 can preferably have a surface of 0.4 m² to 0.8 m², wherein a surface of 0.6 m² to 0.8 m² is preferred for unloading devices 1 which work with drums as containers, whereas a surface of 0.4 m² to 0.6 m² is preferred for unloading devices 1 which work with bags as containers.

Furthermore, unloading chamber 2 of unloading device 1 comprises a discharge opening 5 by means of which the material to be unloaded or to be emptied can be discharged. For example, a mechanical crushing device can be disposed in the area of discharge opening 5 in order to break up caked material. The crushing device can be designed as a lump breaker (not shown in FIG. 1). A transport length L of the unloading device is preferably defined between the center of insertion opening 3 and the center of discharge opening 5. Further preferably, a particularly good laminar flow and particularly low contamination of the environment is achieved if the ratio of surface $A_1$ of insertion opening 3 to transport length L is smaller than 0.3 m, preferably between 0.08 m and 0.22 m, in particular between 0.10 m and 0.20 m.

Transport length L can preferably be chosen as long as possible, because the treatment of the containers taking place in the area of discharge opening 5 may potentially cause turbulence in the airflow.

Unloading chamber 2 of unloading device 1 also comprises an outlet opening 6 via which emptied containers, i.e., bags or inner liners of drums, can be removed from unloading device 1 after appropriate sealing, for example. In the example of FIG. 1, ventilation opening 4 is followed by a pre-filter 7 and a double HEPA filter 8, ventilation opening 4 being connected to pump means 10 via filters 7, 8 and a pipeline 9. Air can be sucked in by means of pump means 10, a laminar airflow directed from insertion opening 3 in the direction of ventilation opening 4 thus being created inside unloading chamber 2.

Pump means 10 are preferably connected to control means which are configured to change or regulate the airflow. The control means can ensure that, depending on the material to be unloaded, for example depending on the particle volume, the particle density and/or the particle weight, the transport of particles is performed in an optimal manner and, in particular, that a correspondingly optimal airflow is generated. The control means can be designed in such a manner that the airflow is specified or set by a user. Alternatively, an automatic identification of the material and an automatic control of pump means 10 by the control means can also be provided. Overall, a reduction of the airflow can be provided if a material has a low density or light particles.

Pre-filter 7 can be realized as a cloth, for example, which contacts a wall surface of unloading chamber 2 and which is clamped into a frame (not shown) or otherwise fixed to the frame. Pre-filter 7 can preferably be changed inside unloading chamber 2, in particular by taking off the frame and removing the cloth. Used and potentially clogged or blocked pre-filter 7 can be safely disposed of through outlet opening 6.

To generate and maintain a laminar airflow depending on the states of filters 7, 8 and the performance of pump means 10, unloading device 1 can also comprise one or several pressure sensor means 24 which each measure the air pressure at specified points of unloading device 1. In the example of FIG. 1, three pressure sensor means 24 measuring the respective pressure or air pressure can be provided in the area of pre-filter 7 and filters 8. For example, the pressure difference can also be determined via respective filters 7, 8 by means of corresponding evaluation means (not shown). Said pressure differences can in turn be used to determine the state of the filters and the need for a filter change.

The cross section of part of unloading chamber 2 increases from insertion opening 3 in the direction of ventilation opening 4 or in the direction of discharge opening 5. For example, the cross section of unloading chamber 2 has a first cross section $A_1$ in the area of insertion opening 3, first cross section $A_1$ increasing up to a maximal cross section $A_{max}$ in the area of discharge opening 5. This has the effect that a laminar airflow is created which has a greater flow speed in the area of insertion opening 3 than in the area of discharge opening 5 or ventilation opening 4, for example.

Bags of toxic material or material hazardous to health, for example, can be inserted into the inside of the unloading chamber via insertion opening 3. To this end, closure device 11 of the insertion opening can be opened. As soon as or even before such a container is inside the unloading chamber, pump means 10 can be activated, for example at the same time as closure device 11 is opened, and a laminar airflow from insertion opening 3 in the direction of ventilation opening 4 can be generated. When the container, e.g. the bag, is then opened and emptied inside the unloading chamber, the laminar airflow inside unloading chamber 2 ensures that no particles of the material escape, even if closure device 11 remains temporarily or completely open during the emptying or unloading of the container. A particularly high throughput of containers and therefore of material can thus be achieved while a particularly high level of contamination protection can be ensured.

FIG. 2 shows a modified embodiment of an unloading device 1 in which a container 12 in the form of a drum 13 can be lifted to insertion opening 3 of unloading chamber 2 and, if required, tilted by means of a lifting device (not shown). At the process stage shown in FIG. 2, closure device 11 of insertion opening 3 is already open, container 12 has already been lifted, tilted and opened and an inner package of drum 13 has already been removed by means of a container conveyor or transport means, which is shown in the form of a pulley system 14 in the example of FIG. 2. In this process, the inner package or liner 15 of container 12 has passed through a vertical partition wall 16 by means of pulley system 14, partition wall 16 having a hinged door 17 hinged on one side as variable passage opening 18. Passage opening 18 preferably extends over 30% to 50% of the height of partition wall 16. Accordingly, a laminar airflow between insertion opening 3 and ventilation opening 4 has also already been generated by means of the pump means (not shown in FIG. 2) at the process stage shown in FIG. 2, said laminar airflow then also being maintained and being maintainable because an air gap 19 is intentionally left or realized between container 12 and insertion opening 3 to allow air to continue to flow into the inside of the unloading chamber.

In addition to a first cross section A1 in the area of the insertion opening and a second, larger cross section A2 in the area of partition wall 16, the cross section of unloading device 1 has a maximal cross section Amax in the area of discharge opening 5. Enlarged cross section A2 is mainly used to generate and maintain a laminar airflow. In addition to the maintenance of the laminar airflow, largest cross section Amax also serves another purpose. After all, a maximal height of unloading chamber 2 is also achieved by the maximal cross section. Pulley system 14 can thus be realized and disposed in such a manner that the container to be emptied or to be unloaded is kept completely in the air by pulley system 14, namely in a position which is as exactly above discharge opening 5 as possible. The container, in the present case liner 15, can thus be opened, for example sliced, and emptied without shaking the container and thereby causing turbulence. Additionally, the container can be lowered onto discharge opening 5 by pulley system 14 after it has been opened or sliced, an emptying process also as dust-free as possible thus being enabled.

A handling aid, such as a disposable cord, which ensures the secure coupling of the container or liner 15 to pulley system 14, for example to a hook of pulley system 14, can be used together with pulley system 14. Preferably, said handling aid is first fixed, in particular knotted, to the container or liner 15 and is then connected to pulley system 14. The handling aid can be dimensioned and realized in such a manner that it allows safe handling of the container, in particular safe lifting of the container, as indicated, for example, in FIG. 2 by means of the position of liner 15.

Liner 15 of container 12 removed by means of pulley system 14 can thus be opened, for example sliced, and emptied without the risk of causing contamination of the environment that exceeds the relevant OEB or OEL limit value.

FIG. 3 shows a process state which essentially corresponds to the process state of FIG. 2, unloading device 1 differing from the unloading device of FIG. 2 in that no air gap 19 exists between container 12 and insertion opening 3. Instead, a seal device 20 is provided, container surface 21 coming into sealing contact with seal device 20. For example, this can be achieved in that seal device 20 is realized as an expandable seal ring to which pressure can be applied and which comprises appropriate pressure means, so that pressure can be exerted or applied to the seal ring after container 12 has been arranged accordingly, said seal ring thus pressing against container surface 21 in a sealing manner.

To ensure that the laminar airflow between insertion opening 3 and ventilation opening 4 is maintained or can be maintained in the exemplary embodiment of FIG. 3, unloading device 1 comprises a nozzle arrangement 22 which is disposed in the area of insertion opening 3 and which in turn interacts with pump means 23 and allows the generation of an airflow in the direction of ventilation opening 4. In this way, insertion opening 3 is closed and even sealed in the course of the emptying and unloading of container 12 in the exemplary embodiment of FIG. 3; however, the laminar airflow ensuring that particles of the material which may still be located or disposed in the area of insertion opening 3 are transported away from insertion opening 3 can still be maintained. Furthermore, this can ensure that no ambient air or only an insignificant amount of ambient air which has the potential of polluting or contaminating the material enters unloading device 1, in particular unloading chamber 2.

REFERENCE SIGNS

1 unloading device
2 unloading chamber
3 insertion opening
4 ventilation opening
5 discharge opening
6 outlet opening
7 pre-filter
8 double HEPA filter
9 pipeline
10 pump means
11 closure device
12 container
13 drum
14 pulley system
15 liner
16 vertical partition wall
17 hinged door
18 passage opening
19 air gap
20 seal device
21 container surface
22 nozzle arrangement
23 pump means
24 pressure sensor means
$A_1$ first cross section
$A_2$ second cross section
$A_{max}$ maximal cross section

The invention claimed is:

1. An unloading device for unloading loose material hazardous to health from rigid or flexible containers, the unloading device comprising:
   an unloading chamber comprising a discharge opening discharging the material after removal from a container of the rigid or flexible containers,
   an insertion opening for at least partial insertion of the container into the unloading chamber,
      wherein the unloading chamber has a ventilation opening which is disposed on a side of the unloading chamber opposite the insertion opening and which is connected to pump means to generate an airflow inside the unloading chamber, the airflow causing a laminar airflow from the insertion opening in a direction of the ventilation opening,
   wherein
   a partition wall having a variable passage opening is disposed between the insertion opening and the unloading chamber inside the unloading chamber, wherein the variable passage opening is designed and dimensioned in such a manner that the container to be emptied passes through the variable passage opening, and the variable passage opening is also designed in such a manner that no airtight sealing or closure is achieved by the partition wall in any state during the emptying, and wherein
   a nozzle arrangement is disposed in an area of the insertion opening, the nozzle arrangement being connected to pump means to generate an airflow in the direction of the ventilation opening, and wherein the ventilation opening is configured for extraction of a volume of flow proportional to a size or surface of the insertion opening.

2. The unloading device according to claim 1, wherein a cross section of at least part of the unloading chamber increases from the insertion opening in the direction of the ventilation opening.

3. The unloading device according to claim 2, further comprising a closure device for reversible opening and closing of the insertion opening.

4. The unloading device according to claim 1, further comprising a seal device for sealing contact with container surfaces in an area of the insertion opening.

5. The unloading device according to claim 1, further comprising a container conveyor or transport means inside the unloading chamber which comprise a pulley system to transport the container.

6. The unloading device according to claim 1, wherein the loose material comprises powdery material and the containers comprise bags or drums.

7. The unloading device according to claim 1, wherein the partition wall is a vertical partition wall.

8. The method according to claim 1, wherein the volume flow is 200 to 800 m³/h.

9. A method for unloading loose material hazardous to health from rigid or flexible containers, the method comprising:
- at least partial insertion of a container of the rigid or flexible containers into an unloading chamber via an insertion opening of the unloading chamber and
- emptying of the container and discharge of the material via a discharge opening of the unloading chamber,
  - wherein, at least during the emptying of the container, an airflow is generated by a ventilation opening which is disposed on a side of the unloading chamber opposite the insertion opening and by pump means assigned thereto, the airflow causing a laminar airflow from the insertion opening in a direction of the ventilation opening, wherein
before the container is emptied, the container passes through a partition wall having a variable passage opening between the insertion opening and the unloading chamber inside the unloading chamber, wherein the variable passage opening is designed and dimensioned in such a manner that the container to be emptied passes through the variable passage opening and wherein the variable passage opening is designed in such a manner that no airtight sealing or closure is achieved by the partition wall in any state during the emptying and wherein a nozzle arrangement is disposed in an area of the insertion opening, the nozzle arrangement being connected to pump means in such a manner that an airflow in the direction of the ventilation opening is generated, the method further comprising extracting a volume flow through the ventilation opening, the volume flow being proportional to a size or surface of the insertion opening.

10. The method according to claim 9, wherein the airflow is 0.6 to 0.8 m/s in the area of the insertion opening.

11. The method according to claim 9, wherein at least part of the cross section of the unloading chamber increases from the insertion opening in the direction of the ventilation opening, the speed of the airflow in the area of the discharge opening thus being reduced to approximately ⅓ to ⅙ of the speed in the area of the insertion opening.

12. The method according to claim 11, wherein the speed of the airflow is reduced to 0.1 to 0.3 m/s.

13. The method according to claim 9, wherein the insertion opening is opened by means of a closure device for the reversible opening and closing of the insertion opening in order to at least partially insert the container.

14. The method according to claim 13, wherein the insertion opening remains open during emptying of the container.

15. The method according to claim 9, wherein a seal device is disposed in the area of the insertion opening, the seal device coming into sealing contact with a container surface, before the container is emptied.

16. The method according to claim 15, wherein the container surface is a drum surface.

17. The method according to claim 9, wherein the loose material is powdery material, and wherein the containers comprise bags or drums.

18. The method according to claim 9, wherein the partition wall is a vertical partition wall.

19. The method according to claim 9, further comprising transporting the container with a container conveyor or transport means inside the unloading chamber which comprises a pulley system.

* * * * *